US008801206B2

(12) United States Patent
Chen et al.

(10) Patent No.: US 8,801,206 B2
(45) Date of Patent: Aug. 12, 2014

(54) LIGHT-EMITTING KNOB MECHANISM AND AN AUDIO SYSTEM INCORPORATING THE SAME

(75) Inventors: Shih-Hong Chen, Hsinchu County (TW); Yung-Te Huang, Hsinchu County (TW)

(73) Assignee: Wistron NeWeb Corp., Hsinchu County (TW)

( * ) Notice: Subject to any disclaimer, the term of this patent is extended or adjusted under 35 U.S.C. 154(b) by 190 days.

(21) Appl. No.: 13/603,890

(22) Filed: Sep. 5, 2012

(65) Prior Publication Data

US 2013/0163226 A1  Jun. 27, 2013

(30) Foreign Application Priority Data

Dec. 21, 2011 (TW) .............................. 100147714 A

(51) Int. Cl.
  *F21V 33/00* (2006.01)
(52) U.S. Cl.
  USPC .............................................. 362/85; 362/86
(58) Field of Classification Search
  USPC .................................... 362/85, 86, 23, 27, 29
  See application file for complete search history.

(56) References Cited

U.S. PATENT DOCUMENTS 6,685,327 B2 * 2/2004 Dorrie .............................. 362/27
6,876,313 B2 * 4/2005 Hsiung et al. ................... 341/35

* cited by examiner

*Primary Examiner* — Vip Patel
(74) *Attorney, Agent, or Firm* — Dickstein Shapiro LLP

(57) ABSTRACT

A knob mechanism includes an encoder and a light guide unit. The light guide unit includes a lower member tightly sleeved on the encoder, protruding out of a housing, and having an opening and an optical channel, and an upper ring sleeved on the lower member, and having a light incident surface connected to the optical channel and a light transmitting surface spaced apart from the light incident surface. A rotary rod of the encoder protrudes out of the lower member through the opening. A knob is engaged to the rotary rod and is operable to rotate the same about an axis. Light irradiating the lower member propagates through the optical channel, into the light incident surface, and then out from the light transmitting surface in radial directions.

9 Claims, 7 Drawing Sheets

LIGHT-EMITTING KNOB MECHANISM AND AN AUDIO SYSTEM INCORPORATING THE SAME

CROSS-REFERENCE TO RELATED APPLICATION

This application claims priority of Taiwanese Patent Application No. 100147714, filed on Dec. 21, 2011, the disclosure of which is incorporated herein by reference.

BACKGROUND OF THE INVENTION

1. Field of the Invention

The invention relates to a knob mechanism, and more particularly to a light-emitting knob mechanism.

2. Description of the Related Art

In a conventional vehicle audio system, adjustment to a desired volume level or channel is generally operated through the use of a button or a knob. However, the button or knob of the vehicle audio system is not easily recognized in the dark, leading to the possibility of false operation or even adversely affecting the driving safety.

Some manufacturers integrate the function of operating the vehicle audio system into the steering wheel to provide easy operation by a driver. However, convenient operation by other passengers is still not facilitated by such a design.

In some vehicle audio systems, an electronic button or knob is equipped with a light-emitting light guide ring to provide a self-illuminating function. However, such an electronic button or knob often suffers from the centrality shift due to cumulative tolerance resulting from the assembly process, thereby adversely affecting the light-emitting uniformity, and greatly compromising the illuminating effect. Therefore, there is the need for providing on the light emission design of an electronic button or knob.

SUMMARY OF THE INVENTION

Therefore, an object of the present invention is to provide a light-emitting knob mechanism capable of improving transmittance uniformity. According to one aspect of the present invention, there is provided a light-emitting knob mechanism to be disposed on a circuit board. The circuit board is covered by an upper housing which has a first opening in spatial communication with the external environment. The light-emitting knob mechanism includes an encoder, a light guide unit, a knob, and a light emitting unit.

The encoder is to be disposed on the circuit board, and includes a rotary rod. The rotary rod protrudes out of the upper housing through the first opening, and is rotatable about an axis thereof relative to the circuit board. Rotation of the rotary rod triggers the circuit board to generate a control signal.

The light guide unit includes a lower light guide member and an upper light guide ring. The lower light guide member is tightly sleeved on the encoder, protrudes out of the upper housing through the first opening, and has a second opening and at least one optical channel. The rotary rod of the encoder protrudes out of the lower light guide member through the second opening. The upper light guide ring has a third opening, a light incident surface connected to said at least optical channel, and a light transmitting surface spaced apart from the light incident surface. The upper light guide ring is sleeved on the lower light guide member through the third opening.

The knob is engaged to the rotary rod that protrudes from the second opening of the lower light guide member, and is operable to rotate the rotary rod so as to trigger the circuit board to generate the control signal.

The light emitting unit is to be secured to the circuit board, and includes a light emitting element adjacent to the encoder and capable of emitting light. The light emitted from the light emitting element of the light emitting unit irradiates the lower light guide member, propagates through said at least one optical channel of the lower light guide member, is incident upon the light incident surface of the upper light guide ring, and is then transmitted out from the light transmitting surface in radial directions away from the axis.

According to another aspect of the present invention, there is provided an audio system that includes an audio host device and a panel. The audio host device includes a lower housing, a central control unit disposed inside the lower housing, and an audio output unit electrically connected to the central control unit. The panel is mounted to the lower housing, and includes a circuit board that is electrically connected to the central control unit, the above-mentioned upper housing and the above-mentioned knob mechanism. The upper housing is engaged to the lower housing for enclosing the circuit board.

The effect of the present invention lies in that the encoder on the circuit board is taken as a basis for assembly, where the lower light guide member of the light guide unit is sleeved on the encoder, the upper housing is engaged with the lower light guide member to cover the circuit board, the upper light guide ring is sleeved on the lower light guide member, and the knob is engaged to the rotary rod of the encoder, to facilitate an assembly procedure that ensures a high concentricity for the elements of the knob mechanism, thereby achieving a more uniform light transmission.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

Figure 1:
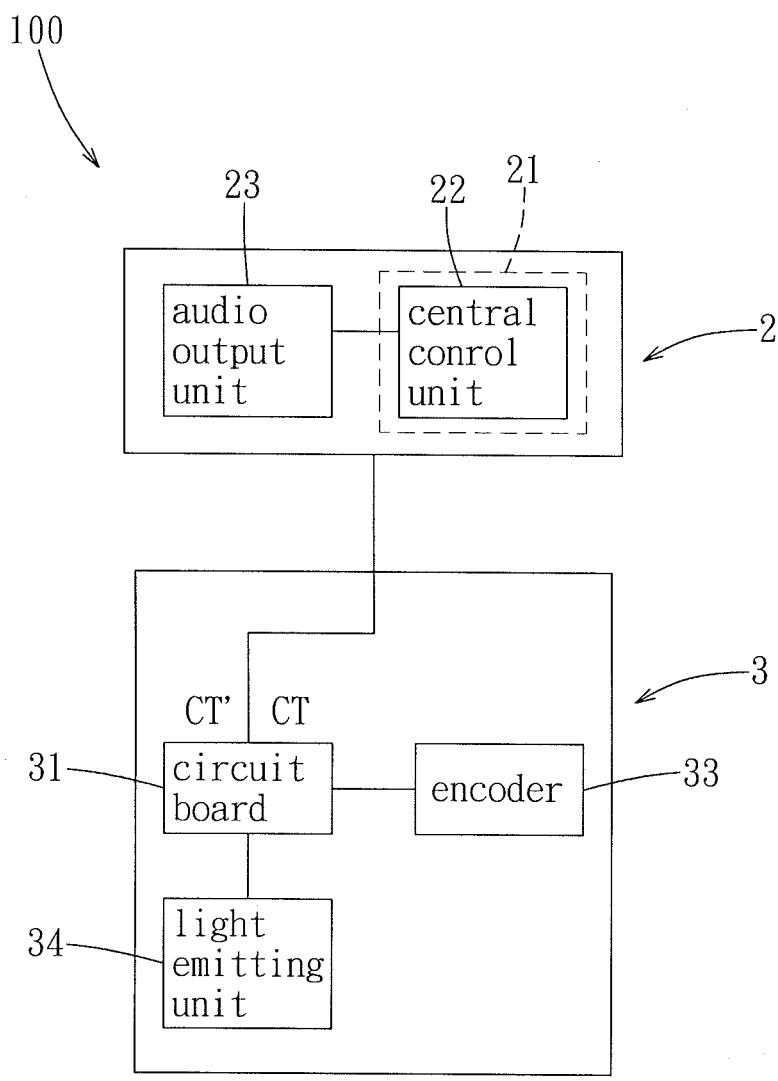
FIG. 1 is a circuit block diagram of a first embodiment of an audio system having a knob mechanism according to the present invention.

The above-mentioned and other technical contents, features, and effects of this invention will be clearly presented from the following detailed description of two embodiments in coordination with the reference drawings.

Before this invention is described in detail, it should be noted that, in the following description, similar elements are designated by the same reference numerals.

Figure 2:
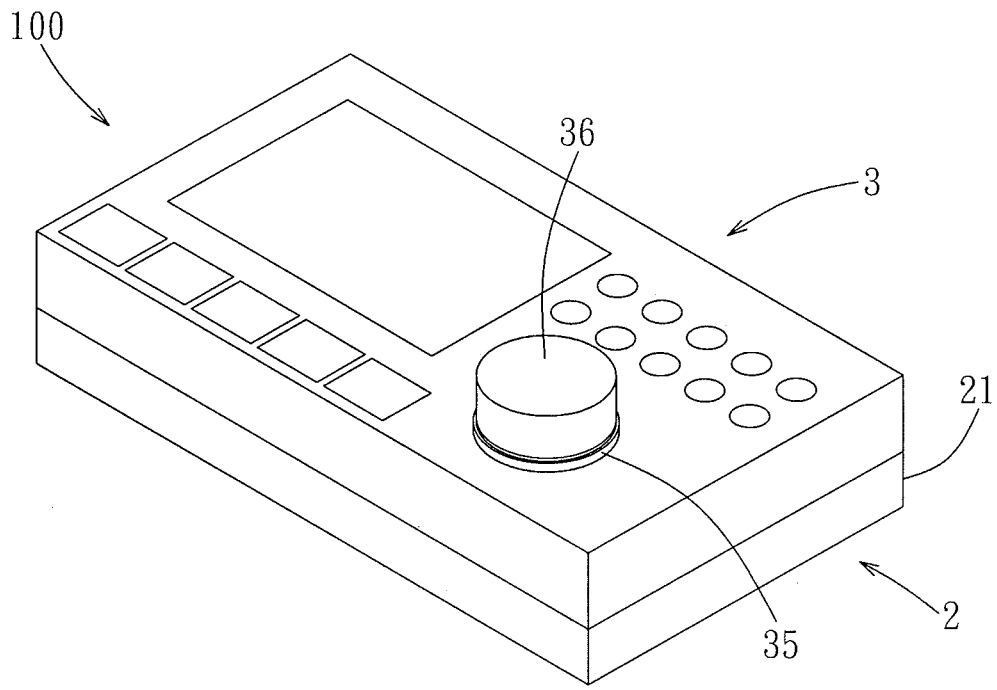
FIG. 2 is a schematic assembled view of the first embodiment, illustrating an audio host device and a panel.
Figure 3:
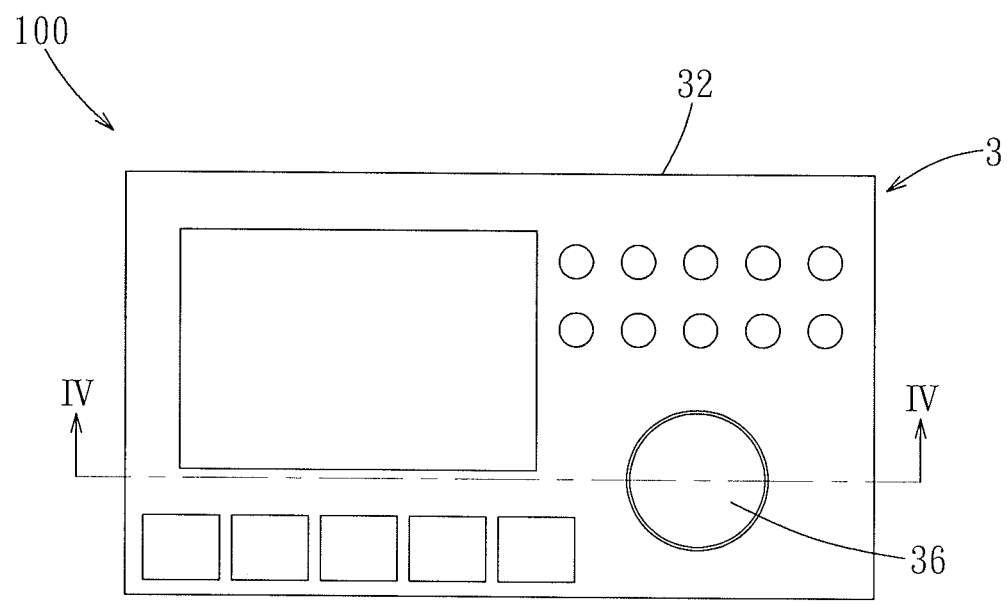
FIG. 3 is a schematic front view of the first embodiment, illustrating the panel.

Referring to FIGS. 1, 2 and 3, a first embodiment of an audio system 100 according to the present invention includes a host device 2 and a panel 3. The host device 2 includes a lower housing 21, a central control unit 22 disposed inside the lower housing 21, and an audio output unit 23 electrically connected to the central control unit 22. In this embodiment, the host device 2 is a host device of a vehicle audio system and is adapted to be mounted on a center console of a vehicle, and the audio output unit 23 is a speaker. However, the present invention is not limited in this respect. Alternatively, the host device 2 of the present invention may also be designed to be a host device of an ordinary home audio.

Referring to FIGS. 1, 2, 4 and 5, the panel 3 is mounted to the lower housing 21 of the host device 2, and includes a circuit board 31 electrically connected to the central control unit 22, an encoder 33 disposed on the circuit board 31, a light emitting unit 34 secured to the circuit board 31, a light guide unit 35 sleeved on the encoder 33, an upper housing 32 engaged with the light guide unit 35 and coupled to the lower housing 21 so as to enclose the circuit board 31, and a knob 36 disposed on the encoder 33. The upper housing 32 has a first opening 321 in spatial communication with the external environment.

Figure 5:
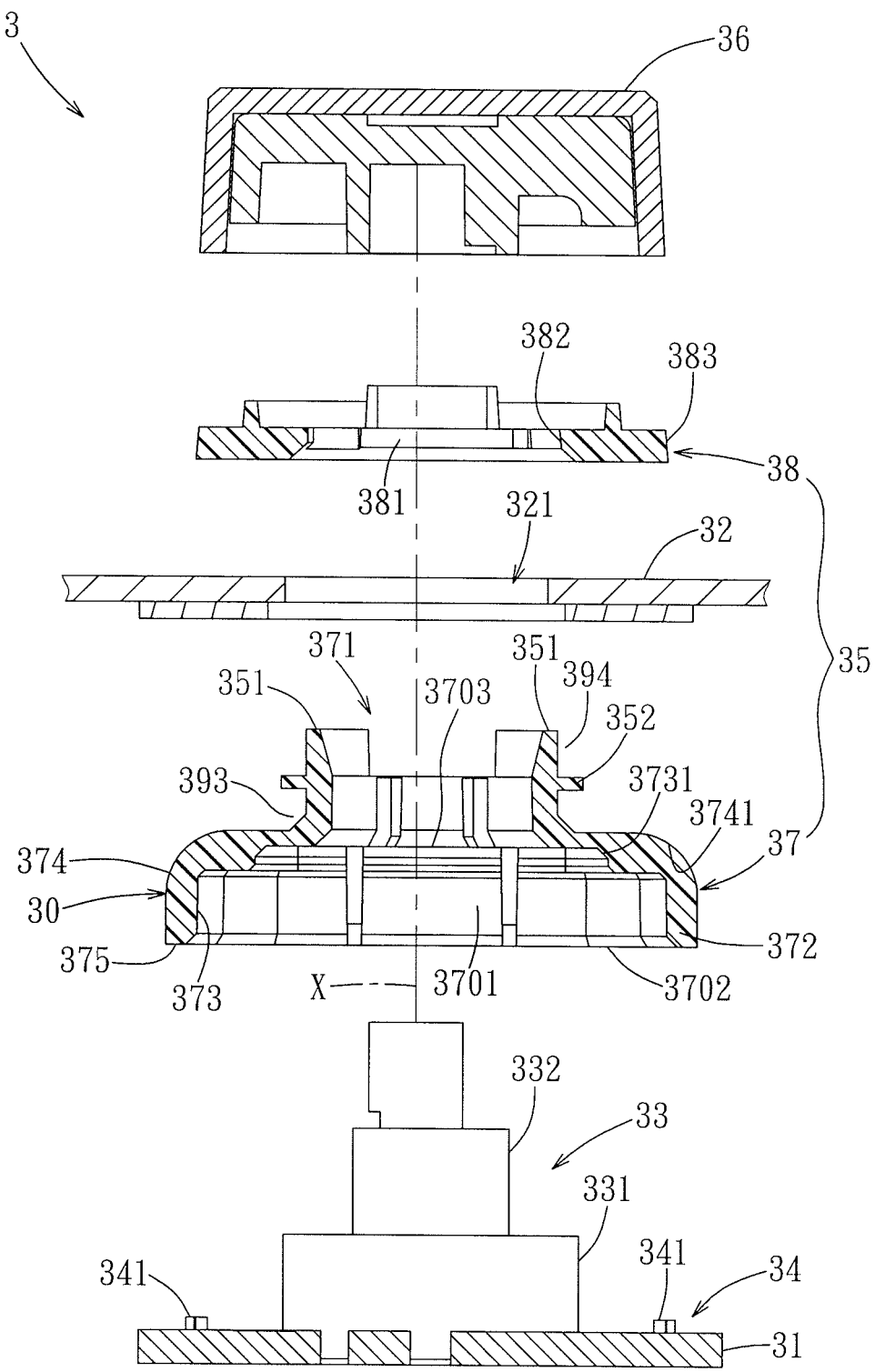
FIG. 5 is an exploded partly-sectional view of the first embodiment, illustrating an assembly of the panel.

Referring to FIGS. 1 and 5, the encoder 33 includes a securing seat 331 secured to the circuit board 31, and a rotary rod 332 rotatably disposed on the securing seat 331. The rotary rod 332 protrudes out of the upper housing 32 through the first opening 321, and is rotatable about an axis (X) thereof relative to the circuit board 31. The circuit board 31 is triggered to generate a control signal (CT) as a result of rotation of the rotary rod 332, and transmits the control signal (CT) to the host device 2 for operating the same. In this embodiment, the rotary rod 332 of the encoder 33 is known in the art. In a common design known in the art, the rotary rod 332 may further have a press operation mode, so that the circuit board 31 is triggered to generate another control signal (CT') as a result of pressing the rotary rod 332. Further details of the same are omitted herein for the sake of brevity.

The light emitting unit 34 includes a plurality of light emitting elements 341 disposed around the encoder 33 and capable of emitting light. In this embodiment, each of the light emitting elements 341 may be a light emitting diode (LED) or a neon light bulb, but the present invention is not limited thereto.

Figure 4:
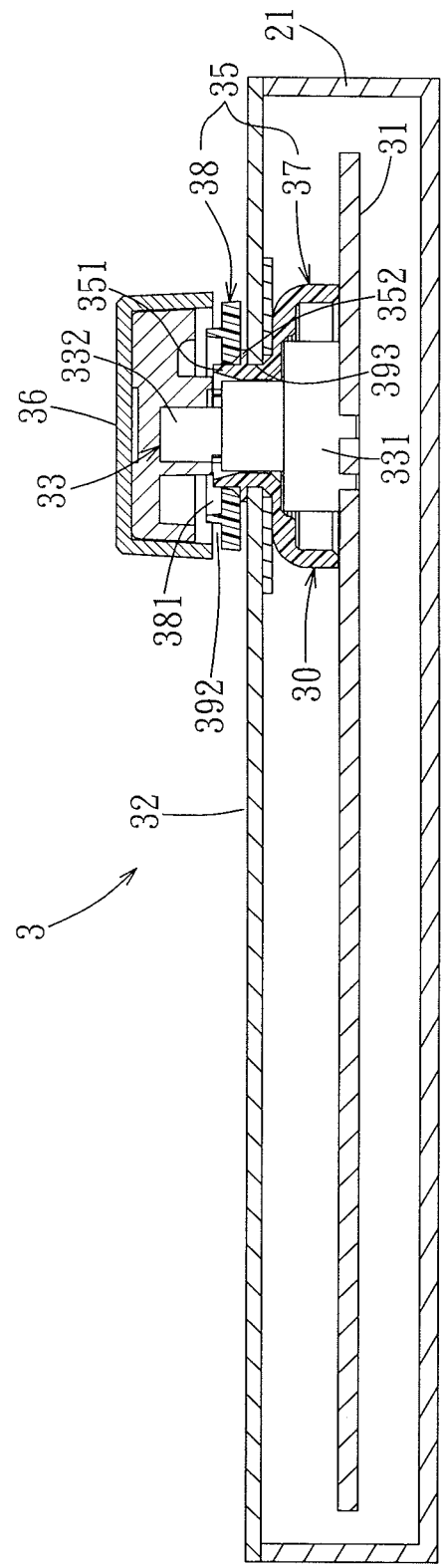
FIG. 4 is a sectional view taken along line IV-IV in FIG. 3, illustrating an assembly of the audio system.
Figure 6:
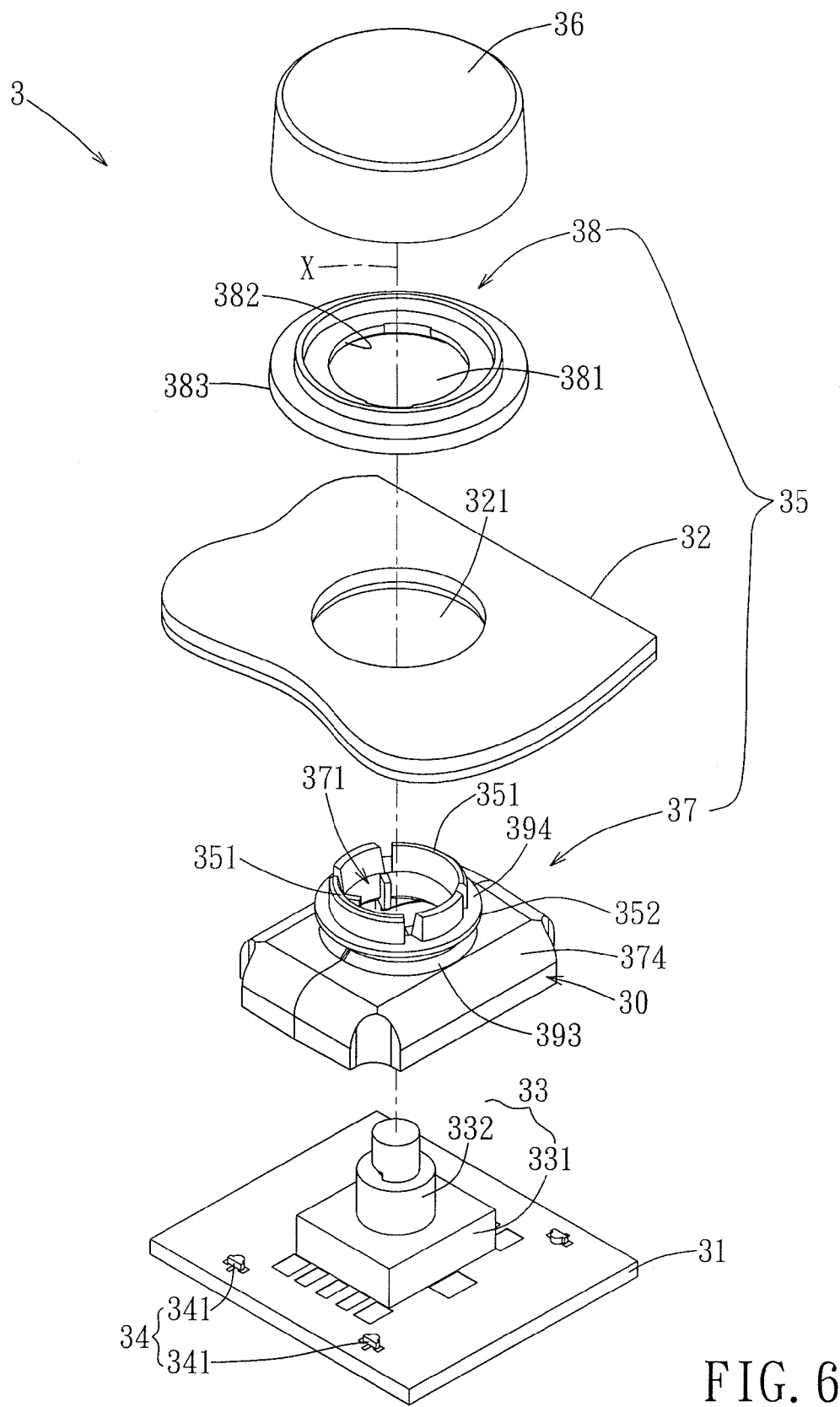
FIG. 6 is an exploded perspective view of the first embodiment, illustrating the design of a light guide unit.

Referring to FIGS. 4, 5 and 6, the light guide unit 35 includes a lower light guide member 37 and an upper light guide ring 38 sleeved on the lower light guide member 37. In this embodiment, the lower light guide member 37 and the upper light guide ring 38 are made of plastic materials, and are transparent and partially polished so as to provide internal reflections of light therewithin. However, the lower light guide member 37 and the upper light guide ring 38 are not limited in terms of material. The lower light guide member 37 is tightly sleeved on the encoder 33, protrudes out of the upper housing 32 through the first opening 321, and has a second opening 371 and at least one optical channel 372. The rotary rod 332 of the encoder 33 extends through the second opening 371 and protrudes out of the lower light guide member 37.

Specifically, the lower light guide member 37 includes a base 30 defining a receiving space 3701. The receiving space 3701 has a lower receiving opening 3702 adjacent to the circuit board 31, and an upper receiving opening 3703 distal from the circuit board 31 and in spatial communication with the second opening 371. The lower light guide member 37 further includes four surrounding plates 351 respectively extending from the base 30 at a periphery of the upper receiving opening 3703 along the axis (X) in a direction away from the circuit board 31 and spaced apart from one another, and a stop plate 352 protruding from central positions of outer plate surfaces of the surrounding plates 351 in radial directions away from the axis (X). The surrounding plates 351 are arc-shaped and arranged to surround the second opening 371. An outer edge of the stop plate 352 is circular-shaped and also surrounds the second opening 371. The encoder 33 is extends into the receiving space 3701 through the lower receiving opening 3702 of the lower light guide member 37, and is tightly sleeved by the lower light guide member 37.

More specifically, the base 30 has a first base surface 373 that is partially bent, a second base surface 374 that surrounds the first base surface 373 and that is partially bent, and a connecting surface 375 that connects the first base surface 373 and the second base surface 374. The surrounding plates 351 are formed integrally with the base 30. The first base surface 373 has a first reflecting surface portion 3731, and the second base surface 374 has a second reflecting surface portion 3741. The first reflecting surface portion 3731 and the second reflecting surface portion 3741 are surface-polished. The first base surface 373, the second base surface 374, the connecting surface 375, the surrounding plates 351, and the stop plate 352 cooperate to define said at least one optical channel 372. The stop plate 352 and a part of the second base surface 374 cooperate to define an annular lower engaging groove 393 for engagement with the upper housing 32 such that the upper housing 32 is sleeved on the lower light guide member 37. Upper parts of the surrounding plates 351 and the stop plate 352 cooperatively define an upper positioning space 394.

The upper light guide ring 38 has a third opening 381, a light incident surface 382 located at an inner periphery thereof and connected with said at least optical channel 372, and a light transmitting surface 383 located at an outer periphery thereof and spaced apart from the light incident surface 382. The upper light guide ring 38 is sleeved on the lower light guide member 37 through the third opening 381, and is tightly engaged in the upper positioning space 394 of the lower light guide member 37.

In other words, when the upper light guide ring 38 and the upper housing 32 are tightly and respectively engaged in the upper positioning space 394 and the lower stopping groove 393 of the lower light guide member 37, and when the lower light guide member 37 is tightly sleeved on the encoder 33, the upper light guide ring 38 is tightly abutted against by the surrounding plates 351 and the stop plate 352, and the upper housing 32 is tightly abutted against by the stop plate 352 and the part of the second base surface 374 and stably covers the circuit board 31, such that the upper light guide ring 38, the upper housing 32, the lower light guide member 37 and the encoder 33 are tightly and securely assembled together. After assembly of the elements 38, 32, 37, and 33 is completed, an upper end of the rotary rod 332 of the encoder 33 protrudes out of the first opening 321 of the upper housing 32 and the third opening 381 of the upper light guide ring 38 away from the circuit board 31.

The knob 36 is engaged to the upper end of the rotary rod 332, and is operable to rotate or press the rotary rod 332 so as to trigger the circuit board 31 to generate the corresponding control signal (CT, CT').

Figure 7:
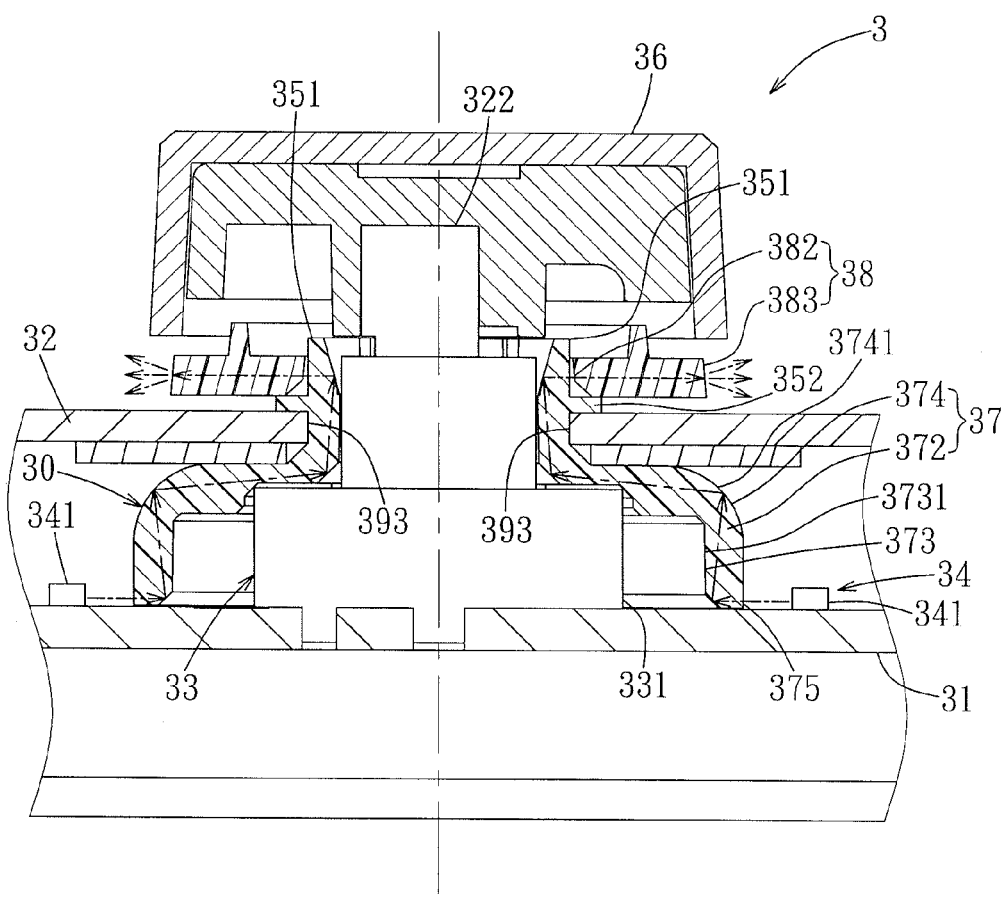
FIG. 7 is a fragmentary schematic partly-sectional view of the first embodiment, illustrating the design of an optical channel of a light guide ring.

Referring to FIGS. 6 and 7, when light from the light emitting unit 34 irradiates the lower light guide member 37, the light is transmitted between the first base surface 373 and the second base surface 374 through said at least optical channel 372. That is to say, the light is incident between the first base surface 373 and the second base surface 374 of the lower light guide member 37, and is transmitted to the surrounding plates 351 of the lower light guide member 37 by virtue of reflections due to the surface-polishing of the first reflecting surface portion 3731 of the first base surface 373 and the second reflecting surface portion 3741 of the second base surface 374 and the bending of the first base surface 373 and the second base surface 374. Then, with the high transmittance of the surrounding plates 351, the light will pass through the surrounding plates 351 to enter the light incident surface 382 of the upper light guide ring 38, and finally propagate out of the upper light guide ring 38 through the light transmitting surface 383 in the radial directions away from the axis (X) to irradiate out of the panel 3 (as shown in FIG. 2).

Figure 8:
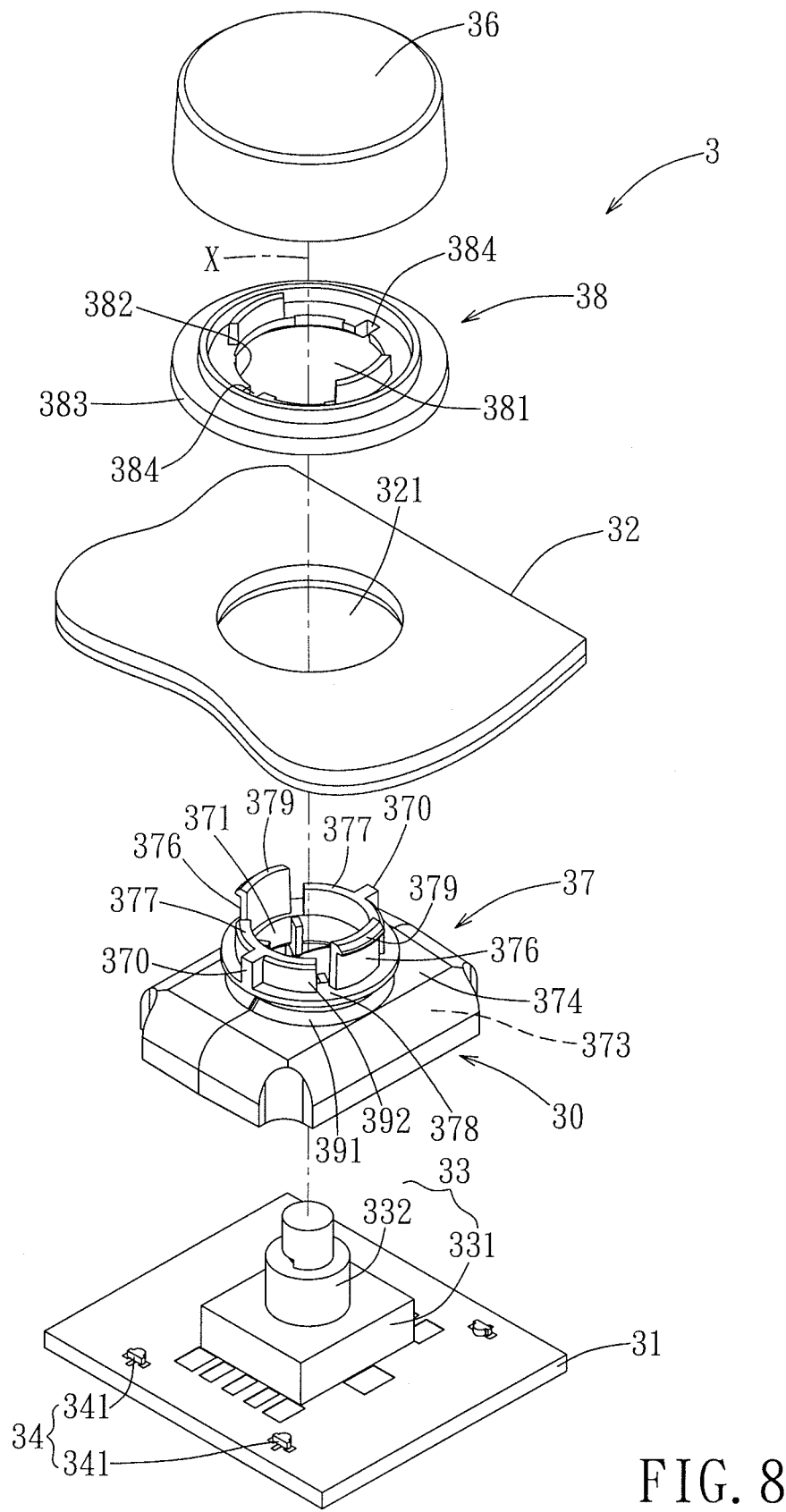
FIG. 8 is an exploded perspective view of a second embodiment of the audio system according to the present invention.

Referring to FIG. 8, a second embodiment according to the present invention is different from the first embodiment in that the lower light guide member 37 includes two first surrounding plates 376 spaced apart from each other and two second surrounding plates 377 spaced apart from each other. The first surrounding plates 376 and the second surrounding plates 377 are arranged alternately, are arc-shaped, and integrally extend from the base 30 at the periphery of the upper receiving opening 3703 (see FIG. 5) along the axis (X) in the direction away from the circuit board 31. The lower light guide member 37 further includes a first stop plate 378 protruding from central positions of outer plate surfaces of the first surrounding plates 376 and the second surrounding plates 377 in radial directions away from the axis (X), two second stop plates 379 each formed integrally with a corresponding one of the first surrounding plates 376 at a top edge thereof, and two positioning plates 370 each protruding from a central position of an outer plate surface of a corresponding one of the second surrounding plates 377 in a corresponding radial direction away from the axis (X).

More specifically, the first and second surrounding plates 376, 377 are arranged alternately and spacedly to surround the second opening 371. The first stop plate 378, the second stop plates 379 and the positioning plates 370 protrude in radial directions away from the axis (X), and the first stop plate 378 is parallel to the second stop plates 379, while being perpendicular to the positioning plates 370. The first stop plate 378 and lower halves of the first surrounding plates 376 and the second surrounding plates 377 cooperate with a part of the second base surface 374 of the base 30 to define an annular first engaging groove 391 for engaging the upper housing 32. Upper halves of the first surrounding plates 376 and the second surrounding plates 377 cooperate with the first stop plate 378, the second stop plates 379, and the positioning plates 370 to define a generally annular second engaging groove 392 (or in the form of two semi-annular grooves) for engaging the upper light guide ring 38 such that the upper light guide ring 38 is assembled with the lower light guide member 37.

In this embodiment, the light incident surface 382 of the upper light guide ring 38 is formed with two positioning grooves 384 for engaging the positioning plates 370 of the lower light guide member 37 therein, respectively. When the upper light guide ring 38 is sleeved on the lower light guide member 37, the positioning plates 370 are tightly and respectively engaged in the positioning grooves 384, so that no misalignment will occur between the upper light guide ring 38 and the lower light guide member 37, thereby achieving a tight positioning assembly effect.

Further, the light emitted by the light emitting elements 341 of the light emitting unit 34 irradiates the lower light guide member 37, and after being reflected inside the lower light guide member 37, enters the light incident surface 382 of the upper light guide ring 38, and is finally transmitted out of the panel 3 through the light transmitting surface 383 in radial directions away from the axis (X).

To sum up, the lower light guide member 37 is tightly sleeved on and thus secured to the securing seat 331 of the encoder 33, the upper housing 32 is securely positioned on the lower light guide member 37 by being engaged in the first stop groove 391 or the lower stop groove 393 of the lower light guide member 37, and the upper light guide ring 38 is then tightly sleeved on the lower light guide member 37 by being engaged in the second stop groove 392 or the upper positioning space 394 of the lower light guide member 37. Such an assembly manner is advantageous in that by utilizing the encoder 33 to facilitate the assembly and positioning of the knob 36 and the light guide unit 35, cumulative tolerance resulting from the assembly process can be reduced effectively, so that after assembly, the knob 36, the encoder 33 and the light guide unit 35 have high concentricity, thereby providing a more uniform light guiding effect. Thus, the objects of the present invention can surely be achieved.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A light-emitting knob mechanism to be disposed on a circuit board which is covered by an upper housing, the upper housing having a first opening in spatial communication with the external environment, said light-emitting knob mechanism comprising:
    an encoder to be disposed on the circuit board, and including a rotary rod, wherein said rotary rod protrudes out of the upper housing through the first opening, and rotatable about an axis thereof relative to the circuit board, rotation of said rotary rod triggering the circuit board to generate a control signal;
    a light guide unit including a lower light guide member and an upper light guide ring, wherein said lower light guide member is tightly sleeved on said encoder, protrudes out of the upper housing through the first opening, and has a second opening and at least one optical channel, said rotary rod of said encoder protruding out of said lower light guide member through said second opening, said upper light guide ring having a third opening, a light incident surface connected to said at least optical channel, and a light transmitting surface spaced apart from said light incident surface, said upper light guide ring being sleeved on said lower light guide member through said third opening;
    a knob engaged to said rotary rod that protrudes from said second opening of said lower light guide member, and operable to rotate said rotary rod so as to trigger the circuit board to generate the control signal; and
    a light emitting unit to be secured to the circuit board, and including alight emitting elements disposed adjacent to said encoder and capable of emitting light, wherein the light emitted from said light emitting element of said light emitting unit irradiates said lower light guide member, propagates through said at least one optical channel of said lower light guide member and is incident upon said light incident surface of said upper light guide ring, and is then transmitted out from said light transmitting surface in radial directions away from the axis.

2. The light-emitting knob mechanism of claim 1, wherein said encoder further includes a securing seat to be secured to the circuit board, said rotary rod being rotatably disposed on said securing seat, said lower light guide member including a base, said base defining a receiving space, said receiving space having a lower receiving opening, and an upper receiving opening in spatial communication with said second opening, wherein said securing seat of said encoder extends through said lower receiving opening and is received in said receiving space so that said lower light guide member is tightly sleeved on said encoder.

3. The light-emitting knob mechanism of claim 2, wherein said base of said lower light guide member has a first base surface defining said receiving space, a second base surface located on an outer side of said first base surface, and a connecting surface connecting said first base surface and said second base surface, said first base surface having a first reflecting surface portion, said second base surface having a second reflecting surface portion, wherein said first reflecting surface portion and said second reflecting surface portion are surface-polished so that light propagates through internal reflections in said base between said first reflection surface portion and said second reflection surface portion.

4. The light-emitting knob mechanism of claim 3, wherein said lower light guide member further includes a plurality of first surrounding plates and a plurality of second surrounding plates extending from said base at an outer periphery of said upper receiving opening along the axis in a direction away from the circuit board, said first and second surrounding plates being spacedly and alternately arranged to surround said second opening, said lower light guide member further including a first stop plate disposed on outerplate surfaces of said first and second surrounding plates, said first stop plate extending in radial directions away from the axis, said first surrounding plates, said second surrounding plates, said first stopping plate and said second base surface cooperatively defining a first engaging groove for engaging the upper housing.

5. The light-emitting knob mechanism of claim 4, wherein said lower light guide member further includes a plurality of second stop plates respectively disposed on said outer plate surfaces of said first surrounding plates, and a plurality of positioning plates respectively disposed on said outer plate surfaces of said second surrounding plates, said second stop plates and said positioning plates extending in radial directions away from the axis and being further away from said base than said first stop plates, said light incident surface of said upper light guide ring being formed with a plurality of positioning grooves for tightly and respectively engaging said positioning plates therein, said first surrounding plates, said second surrounding plates, said first stop plate, said second stop plates and said positioning plates cooperatively defining a second engaging groove for engaging said upper light guide ring to thereby allow said upper light guide ring to be securely sleeved on said lower light guide member.

6. The light-emitting knob mechanism of claim 5, wherein the light emitted by said light emitting element of said light emitting unit is reflected by said first and second base surfaces of said lower light guide member, out through said first and second surrounding plates of said lower light guide member, and then incident upon said light incident surface of said upper light guide ring.

7. The light-emitting knob mechanism of claim 6, wherein said light emitting element of said light emitting unit is a light emitting diode (LED).

8. An audio system comprising:
an audio host device including a lower housing, a central control unit disposed inside said lower housing, and an audio output unit electrically connected to said central control unit; and
an panel mounted to said lower housing of said audio host device, and including a circuit board that is electrically connected to said central control unit, an upper housing that is engaged with said lower housing for enclosing said circuit board, an encoder that is disposed on said circuit board, a light guide unit, a knob, and a light emitting unit secured to said circuit board;
wherein said upper housing has a first opening in spatial communication with the external environment, said encoder including a rotary rod that protrudes out of said upper housing through said first opening, and that is rotatable about an axis thereof relative to said circuit board, rotation of said rotary rod triggers said circuit board to generate a control signal for subsequent transmission to said central control unit;
wherein said light guide unit includes a lower light guide member and an upper light guide ring, said lower light guide member being tightly sleeved on said encoder, protruding out of said upper housing through said first opening, and having a second opening and at least one optical channel, said rotary rod of said encoder protruding out of said lower light guide member through said second opening, said upper light guide ring having a third opening, a light incident surface connected with said at least optical channel, and a light transmitting surface spaced apart from said light incident surface, said upper light guide ring being sleeved on said lower light guide member through said third opening;
wherein said knob is engaged to said rotary rod that protrudes from said second opening, and is operable to rotate said rotary rod so as to trigger said circuit board to generate the control signal;
wherein said light emitting unit includes a light emitting element disposed adjacent to said encoder and capable of emitting light, wherein the light emitted from said light emitting element of said light emitting unit irradiates said lower light guide member, propagates through said at least one optical channel of said lower light guide member, and is incident upon said light incident surface of said upper light guide ring, and is then transmitted out from said light transmitting surface in radial directions away from the axis.

9. The audio system of claim 8, wherein said light emitting element of said light emitting unit is a light emitting diode (LED).

* * * * *